(12) United States Patent
Bugnon et al.

(10) Patent No.: US 6,896,726 B2
(45) Date of Patent: May 24, 2005

(54) SURFACE-TREATED ORGANIC PIGMENTS

(75) Inventors: Philippe Bugnon, Essert (CH); Caroline Sansonnens, Cugy (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 10/476,346

(22) PCT Filed: May 7, 2002

(86) PCT No.: PCT/EP02/05035

§ 371 (c)(1),
(2), (4) Date: Oct. 30, 2003

(87) PCT Pub. No.: WO02/094944

PCT Pub. Date: Nov. 28, 2002

(65) Prior Publication Data

US 2004/0138340 A1 Jul. 15, 2004

(30) Foreign Application Priority Data

May 18, 2001 (CH) ................................................ 929/01
May 18, 2001 (CH) ................................................ 930/01

(51) Int. Cl.$^7$ .......................... C09B 67/00; C09B 69/00
(52) U.S. Cl. ...................... 106/493; 106/410; 106/411; 106/413; 106/494; 106/495; 106/496; 106/497; 106/498; 106/499; 524/81; 524/86; 524/87; 524/88; 524/89; 524/90; 524/186

(58) Field of Search ................................. 106/410, 411, 106/413, 493, 494, 495, 496, 497, 498, 499; 524/81, 86, 87, 88, 89, 90, 186

(56) References Cited

U.S. PATENT DOCUMENTS

| 5,922,118 | A | | 7/1999 | Johnson et al. ............. 106/31.6 |
| 5,955,232 | A | | 9/1999 | Little et al. ................. 430/106 |
| 6,054,238 | A | | 4/2000 | Little et al. ................. 430/106 |
| 6,336,965 | B1 | * | 1/2002 | Johnson et al. ............. 106/31.6 |
| 6,432,194 | B2 | * | 8/2002 | Johnson et al. ............. 106/499 |
| 6,478,863 | B2 | * | 11/2002 | Johnson et al. ............. 106/31.6 |

FOREIGN PATENT DOCUMENTS

| EP | 0755986 | 1/1997 |
| WO | 97/48769 | 12/1997 |
| WO | 99/51690 | 10/1999 |
| WO | 00/52102 | 9/2000 |
| WO | 01/10963 | 2/2001 |
| WO | 01/25340 | 4/2001 |

* cited by examiner

Primary Examiner—Anthony J. Green
(74) Attorney, Agent, or Firm—Tyler A. Stevenson

(57) ABSTRACT

The present invention relates to surface-treated organic pigments, to a process for their preparation and to their use in colouring a high molecular weight organic material. Compared with untreated pigments, the surface-treated pigments exhibit better rheological properties and/or no warping in the pigmenting of partially crystalline plastics.

10 Claims, No Drawings

SURFACE-TREATED ORGANIC PIGMENTS

The present invention relates to surface-treated organic pigments, to a process for their preparation and to their use in colouring a high molecular weight organic material. Compared with untreated pigments, the surface-treated pigments exhibit better rheological properties and/or no warping in the pigmenting of partially crystalline plastics.

WO 00/52102 relates to a process for the preparation of surface-modified pigments, including the preparation in a liquid medium of a premix that comprises a metal nitrite or an organic nitrite and a diazotisable radical containing a) at least one aromatic group (phenyl and naphthyl) or at least one $C_{1-20}$alkyl radical or a mixture thereof and b) at least one ionic group (including salts of —COOH or —SO$_3$H, NR$_3$X), an ionisable group (including —NH$_2$, —NR$_2$, —COOH or —SO$_3$H), a non-ionic group (including alkyl and aryl radicals) or a mixture thereof, the addition of a pigment to the premix and the mixing of the pigment and the premix under the action of strong shearing forces to obtain a reaction product that comprises a surface-modified product.

The surface-modified pigment is readily dispersible in an aqueous system and has good colour hue and colour intensity. The diazotisable organic radical is typically used in a "treatment concentration" of from 0.01 to 5.0 micromol/m$^2$ of the pigment, based on the nitrogen surface of the pigment.

WO 97/48769 relates to surface-modified pigments, for example phthalocyanines or quinacridones, that have no primary amine groups, and have at least one bonded organic group, the organic group containing a) at least one aromatic group and b) at least one ionic group, especially a sulfonic acid group, a phosphonic acid group, a carboxylic acid group or a salt thereof, or an ionisable group or a mixture of an ionic group and an ionisable group. There are also described aqueous compositions and ink compositions that comprise the surface-modified pigment. The surface-modified pigment is distinguished from the untreated pigment by better dispersibility, greater stability and a higher absolute zeta potential. Inks that comprise surface-treated pigments yield very water-resistant prints.

WO 97/47699 relates to a modified pigment comprising a colour pigment containing at least one bonded organic group, the organic group having the formula Ar—R$^1$ or Ar$^1$R$^2$R$^3$, wherein Ar and Ar$^1$ denote an aromatic group, R$^1$ is an aromatic or aliphatic group containing a hydrophobic group and a hydrophilic group, R$^2$ is a hydrophilic group and R$^3$ is an aromatic or aliphatic group containing a hydrophobic group, the organic group being present in a "treatment concentration" of from about 0.10 to about 5.0 micromol/m$^2$ of the colour pigment.

U.S. Pat. No. 5,955,232 describes a toner composition that comprises modified pigment particles containing bonded organic groups, and styrene-polymer-based resin particles. As organic group there may be mentioned inter alia —Ar—(CH$_2$)—NH$_2$, —Ar—(CH$_2$)—NHCH$_3$, —Ar—(CH$_2$)—N(CH$_3$)$_2$, —Ar—(CH$_2$)$_2$—N(CH$_3$)$_2$, —Ar—(CH$_2$)$_2$—NH$_2$, —Ar—(CH$_2$)$_2$—N(CH$_3$)$_2$ and —Ar—(CH$_2$)$_2$—NHCH$_3$, wherein Ar is an aromatic group.

U.S. Pat. No. 6,054,238 describes a toner composition that comprises modified pigment particles containing bonded organic groups, and styrene-polymer-based resin particles. As organic group there may be mentioned inter alia —Ar—(CH$_2$)—N(CH$_3$)$_2$, —Ar—(CH$_2$)$_2$—N(CH$_3$)$_2$, —Ar—(CH$_2$)$_2$—NH$_2$ and —Ar—(CH$_2$)$_2$—NHCH$_3$, wherein Ar is an aromatic group.

The object of the present invention is to provide surface-treated pigments that, compared with untreated pigments, have better rheological properties and/or exhibit no warping in the pigmenting of partially crystalline plastics, wherein the coloristic properties of the pigments should not be appreciably influenced by the modification of the pigment surface.

The problem has surprisingly been solved by surface-treated pigments of formula

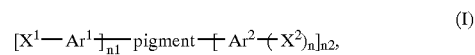

(I)

wherein Ar$^1$ and Ar$^2$ are each independently of the other a phenyl or naphthalene group,
n1 and n2 denote a value from 0 to 0.15, the sum of n1 and n2 being a value from 0.01 to 0.15,
n is an integer 1 or 2, preferably 1,
X$^1$ is a branched or unbranched alkyl radical or alkenyl radical having from 1 to 25 carbon atoms, it being possible for the alkyl radical to be interrupted by one or more S or O atoms, and is preferably a group —Y—(CH$_2$)$_m$R$^1$, wherein
Y is a group —CH$_2$—, —O—, —S—, —C(O)O—, —C(O)—, —C(O)—NH—, —SO$_2$NH— or —SO$_2$— and
R$^1$ is a hydrogen atom or a group —NR$^2$R$^3$, wherein
R$^2$ and R$^3$ are each independently of the other a hydrogen atom or a C$_{1-6}$alkyl radical, and
m is an integer from 1 to 24, especially from 12 to 18,
X$^2$ is a group —COOH, —SO$_3$H or —P(O)OX$^3$OX$^4$, wherein
X$^3$ and X$^4$ are each independently of the other a hydrogen atom or a C$_{1-6}$alkyl radical, especially a hydrogen atom, and
pigment denotes an organic pigment or a mixture of organic pigments, including solid solutions and crystalline solid solutions.

The present invention relates also to a process for the preparation of the surface-treated pigments of formula I according to the invention, comprising the reaction of a diazonium salt of formula

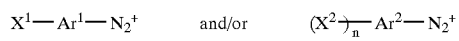

wherein n, X$^1$, X$^2$, Ar$^1$ and Ar$^2$ are as defined above, with an organic pigment or a mixture of organic pigments, including solid solutions and crystalline solid solutions, optionally in the presence of a reducing agent, and to the use of the surface-treated pigment of formula I in the colouring of a high molecular weight organic material.

The surface-treated pigments have improved rheology properties and improved dispersion stability and also exhibit very good gloss values and fastness to light and to migration. The surface treatment of the pigment results especially in a reduction in the viscosity of the pigment dispersion, which enables the dispersion, for example a solvent-based automotive finish, to be loaded with a greater amount of pigment, and can enable partially crystalline plastics to be mass-pigmented without warping. The coloristic properties of the pigments are not adversely affected by the surface modification.

According to the invention, the expression "surface-treated pigment" means that the surface of the pigment has been chemically modified, that is to say groups X$^1$—Ar$^1$— and/or (X$^2$)$_n$—Ar$^2$— been bonded covalently to the surface of the pigment.

The pigment can in principle be any desired organic pigment, provided its surface can be modified by the process according to the invention. The pigment is usually a pigment of the 1-aminoanthraquinone, anthraquinone, anthrapyrimidine, azo, azomethine, quinacridone, quinacridonequinone, quinophthalone, diketopyrrolopyrrole, dioxazine, flavanthrone, indanthrone, indigo, isoindoline, isoindolinone, isoviolanthrone, perinone, perylene, phthalocyanine, pyranthrone or thioindigo series, to the surface of which a group X—Ar— can be bonded chemically by dediazotisation. It has been shown that pigments containing unsubstituted phenyl groups are especially suitable. According to the invention, the term "pigment" is to be understood as including also mixtures of the above-mentioned pigments and also mixtures of the above-mentioned pigments with other pigments, including solid solutions and crystalline solid solutions, the mixtures consisting customarily of from 2 to 5, preferably 2 or 3, components. Solid solutions and crystalline solid solutions of quinacridones are described, for example, in U.S. Pat. No. 3,160,510. Examples include Pigment Red 202, 207, 209 and 206 and Pigment Orange 48 and 49. Solid solutions and crystalline solid solutions of diketopyrrolo[3,4-c]pyrroles (DPP) are described, for example, in U.S. Pat. No. 4,783,540, U.S. Pat. No. 5,529,623, U.S. Pat. No. 5,708,188 and U.S. Pat. No. 6,036,766. Solid solutions and crystalline solid solutions of DPP-type pigments and non-DDP-type pigments, for example quinacridone or quinacridonequinone, are described in U.S. Pat. No. 4,810,304, U.S. Pat. No. 5,472,496, U.S. Pat. No. 4,810,304 and U.S. Pat. No. 5,821,373. An example is a mixed phase of Pigment Red 254 and Pigment Violet 254 (Γ-modification). Monophase solid solutions that contain asymmetric pyrrolo[3,4-c]pyrroles as host are described in U.S. Pat. No. 5,756,746. Preference is given to solid solutions and crystalline solid solutions of C.I. Pigment Red 264 or C.I. Pigment Red 255.

The pigment is preferably selected from quinacridones of formula

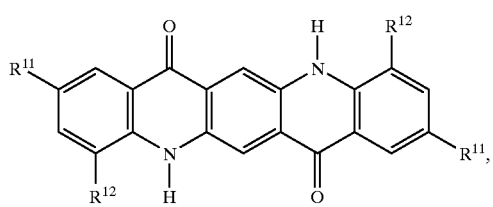

(XI)

wherein $R^{11}$ and $R^{12}$ are each independently of the other hydrogen, halogen, $C_{1-24}$alkyl, especially methyl, $C_{1-6}$alkoxy, especially methoxy, or phenyl, preference being given to quinacridones of formula XI in which at least one of the radicals $R^{11}$ and $R^{12}$ is hydrogen, pyrrolo[3,4-c]pyrroles of formula

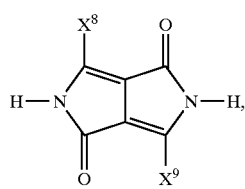

(XII)

wherein at least one of the radicals $X^8$ and $X^9$, preferably both radicals $X^8$ and $X^9$, is/are a group of formula

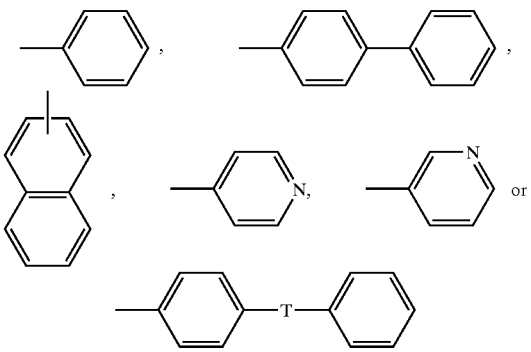

and the other radical can be a group of formula

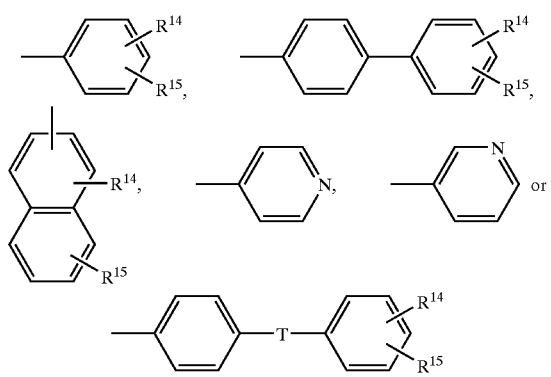

wherein $R^{14}$ and $R^{15}$ are each independently of the other a hydrogen atom, a halogen atom, a $C_{1-24}$alkyl radical, a $C_{1-5}$alkoxy radical, a $C_{1-15}$alkylthio radical, a $C_{1-18}$alkylamino radical, a phenyl group, a trifluoromethyl group or a group CN or $NO_2$, with the proviso that at least one of the radicals $R^{14}$ and $R^{15}$ is not a hydrogen atom, T is —$CH_2$—, —CH($CH_3$)—, —C($CH_3$)$_2$—, —CH=N—, —N=N—, —O—, —S—, —SO—, —$SO_2$— or —$NR^{16}$—, wherein $R^{16}$ is hydrogen or $C_{1-6}$alkyl, especially methyl or ethyl, copper phthalocyanines of formula

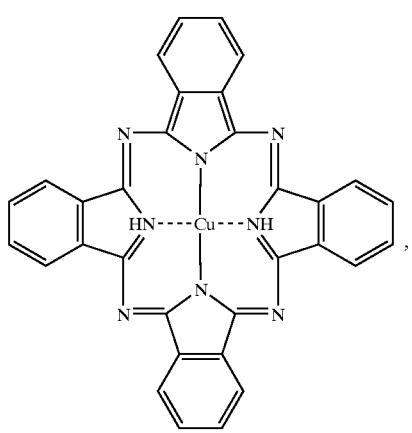

(XIII)

which can be unsubstituted or substituted by from 1 to 5 chlorine atoms, 1-aminoanthraquinone and anthraquinone pigments of formula (XIV)

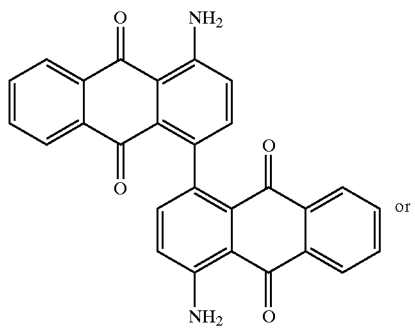

or (XV)

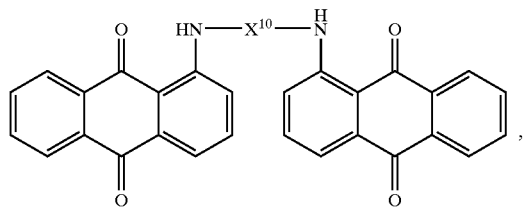

which $X^{10}$ is a group

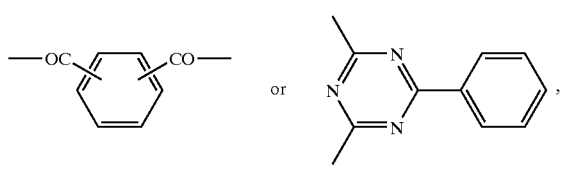

or dioxazines of formula (XVI)

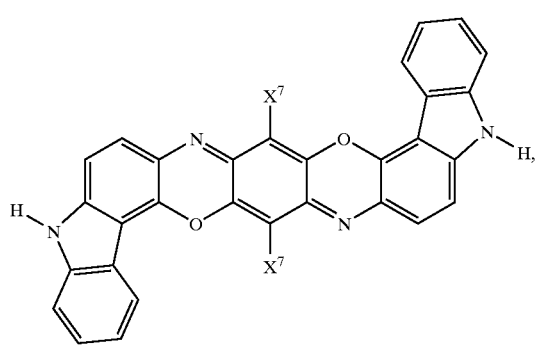

(XVII)

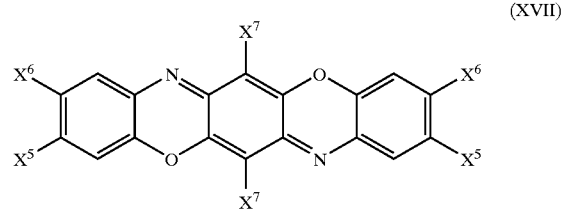

and indanthrones of formula (XVIII)

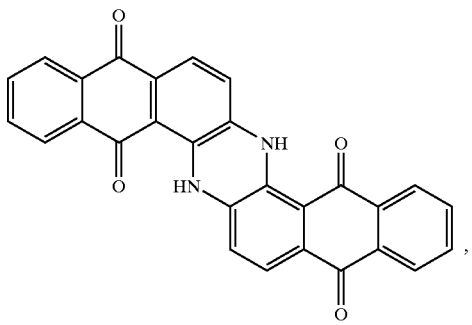

which can be unsubstituted or substituted by 1 or 2 chlorine atoms, wherein $X^5$ is a $C_{1-4}$alkoxy radical, especially ethoxy, $X^6$ is a benzoylamino group and $X^7$ is a chlorine atom or a radical $NHC(O)CH_3$; mixtures of the above-mentioned pigments, including solid solutions and crystalline solid solutions, also being included.

The pigment is especially Pigment Blue 15:p, wherein p is an integer from 1 to 6, C.I. Pigment Red 255, C.I. Pigment Red 264, C.I. Pigment Violet 19, C.I. Pigment Red 177, C.I. Pigment Blue 60 or a solid solution of C.I. Pigment Red 264 or C.I. Pigment Red 255.

Examples of a (straight-chain or branched) $C_{1-24}$alkyl radical are listed hereinafter in the explanation of the group $X^1$. Examples of a (straight-chain or branched) $C_{1-6}$alkoxy radical are methoxy, ethoxy, n-propoxy, isopropoxy, n-butoxy, sec-butoxy, tert-butoxy, amyloxy, isoamyloxy and tert-amyloxy. Examples of a (straight-chain or branched) $C_{1-18}$alkylthio radical are methylthio, ethylthio, n-propylthio, isopropylthio, n-butylthio, sec-butylthio, tert-butylthio, amylthio, isoamylthio and tert-amylthio, heptylthio, octylthio, isooctylthio, nonylthio, decylthio, undecylthio, dodecylthio, tetradecylthio, pentadecylthio, hexadecylthio, heptadecylthio and octadecylthio. Examples of a (straight-chain or branched) $C_{1-18}$alkylamino radical are methylamino, ethylamino, n-propylamino, isopropylamino, n-butylamino, sec-butylamino, tert-butylamino, amylamino, isoamylamino and tert-amylamino, heptylamino, octylamino, isooctylamino, nonylamino, decylamino, undecylamino, dodecylamino, tetradecylamino, pentadecylamino, hexadecylamino, heptadecylamino and octadecylamino. According to the invention halogen atom is understood to mean a fluorine, chlorine, bromine or iodine atom. The meaning of the radicals $Ar^1$ and $Ar^2$ is determined by the ease of use and reactivity of the corresponding diazonium salt. The diazonium salt must, on the one hand, be sufficiently stable that it is easy to use and, on the other hand, must also be sufficiently reactive that by removing nitrogen a covalent bond to the pigment is formed. It has not been possible to obtain satisfactory results with aliphatic diazonium compounds, whereas aromatic diazonium compounds, especially those derived from phenyl and naphthalene, yield very good results. The radicals $X^1$—$Ar^1$— and $X^2$—$Ar^2$— are preferably derived from 1-aminonaphthalene substituted in the 5-position by $X^1$ and $X^2$, respectively, and from 1-aminobenzene substituted in the 4-position by $X^1$ and $X^2$, respectively. Examples of amine compounds from which the diazonium compound and thus the group $Ar^1$—$X^1$— are derived, are procaine ($H_2N$-

Ph-C(O)—O—(CH$_2$)$_2$—N(C$_2$H$_5$)$_2$), procainamide and 4-hexadecylsulfonylaniline. Amine compounds from which the diazonium compound and thus the group Ar$^2$—X$^2$— are derived are especially sulfanilic acid and 1-aminonaphthalene-5-sulfonic acid and 4-aminophenylphosphonic acid as well as 1-amino- or 2-aminonaphthalenedisulfonic acids, such as 4-aminonaphthalene-2,7, 2,6, 1,6, 1,7, 1,5 or 1,3-disulfonic acids.

The sum of n1 and n2 is a value from 0.01 to 0.15, preferably from 0.02 to 0.07, especially from 0.03 to 0.04, wherein n1 and n2 indicate the number of groups X$^1$—Ar$^1$— and X$^2$—Ar$^2$— bonded to the surface of the pigment.

The group X$^1$ is a branched or unbranched C$_{1-25}$alkyl radical or C$_{2-25}$alkenyl radical, wherein the alkyl radical can be interrupted by one or more S or O atoms. Examples of a straight-chain or branched C$_{1-25}$alkyl radical are methyl, ethyl, n-propyl, isopropyl, n-butyl, sec-butyl, tert-butyl, amyl, isoamyl and tert-amyl, heptyl, octyl, isooctyl, nonyl, decyl, undecyl, dodecyl, tetradecyl, pentadecyl, hexadecyl, heptadecyl and octadecyl. Examples of a C$_2$-C$_{25}$alkenyl radical are allyl, methallyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-dodec-2-enyl and n-octadec-4-enyl. C$_{2-25}$Alkyl that is interrupted one or more times by —O— or —S— is, for example, interrupted from 1 to 5 times, e.g. from 1 to 3 times or 1 or 2 times, by non-consecutive-O-radicals or —S— radicals, respectively. The resulting structural units are accordingly, for example: -A(CH$_2$)$_2$ACH$_3$, -A(CH$_2$CH$_2$A)$_2$CH$_2$CH$_3$, —CH$_2$-A-CH$_3$, —CH$_2$CH$_2$-A-CH$_2$CH$_3$, —[CH$_2$CH$_2$A]$_y$CH$_3$, wherein y=1–12, —(CH$_2$CH$_2$A)$_5$CH$_2$CH$_3$, —CH$_2$—CH(CH$_3$)-A-CH$_2$—CH$_2$CH$_3$ or —CH$_2$—CH(CH$_3$)-A-CH$_2$—CH$_3$, wherein A is —O— or —S—.

The group X$^1$ is preferably a group —Y—(CH$_2$)$_m$—R$^1$, wherein Y is a group —CH$_2$—, —O—, —S—, —C(O)O—, —C(O)—, —C(O)—NH—, —SO$_2$NH— or —SO$_2$— and R$^1$ is a hydrogen atom or a group —NR$^2$R$^3$, wherein R$^2$ and R$^3$ are each independently of the other a hydrogen atom or a C$_{1-6}$-alkyl radical and m is an integer from 1 to 24. Compounds in which m is greater than 4, especially from 12 to 18, are especially suitable for mass-colouring partially crystalline plastics.

The group X$^2$ is a group —COOH, —SO$_3$H or —P(O)OX$^3$OX$^4$, wherein X$^3$ and X$^4$ are each independently of the other a hydrogen atom or a C$_{1-6}$alkyl radical, especially a hydrogen atom.

In the surface-treated pigments of formula I, the following are possible: n1>0 and n2=0, n1=0 and n2>0 and n1>0 and n2>0, which result in surface-treated pigments of formulae

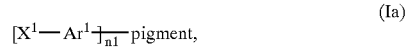 (Ia)

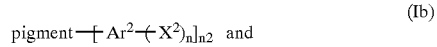 (Ib)

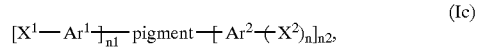 (Ic)

wherein n, pigment, X$^1$, X$^2$, Ar$^1$ and Ar$^2$ are as defined above and n1 and n2 denote a value from 0.01 to 0.15, preferably from 0.02 to 0.07, especially from 0.03 to 0.04.

The surface-treated pigments of formulae Ia, Ib and Ic have improved rheology properties and dispersion stability, the surface-treated pigments of formula Ia in particular being suitable for the warp-free mass-pigmenting of partially crystalline plastics. Compared with surface-treated pigments of formulae Ia and Ib, it is possible to obtain improved rheological properties in the surface-treated pigments of formula Ic by the simultaneous presence of non-ionic, especially basic, groups and acid groups on the pigment surface.

The present invention relates also to a process for the preparation of the surface-treated pigments of formula I according to the invention. The process comprises the reaction of a diazonium salt of formula

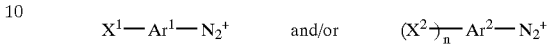

wherein n, X$^1$, X$^2$, Ar$^1$ and Ar$^2$ are as defined above, with a pigment or a mixture of pigments, including solid solutions and crystalline solid solutions, optionally in the presence of a reducing agent.

Depending on the stability and reactivity of the diazonium salt, the dediazotisation can be carried out advantageously in the presence of a reducing agent selected from copper(I) and copper(II) compounds, for example Cu$_2$O or CuSO$_4$, iron(II) compounds, for example Fe$_2$SO$_4$, tin(II) compounds, for example SnCl$_2$, hydroquinones (according to the invention hydroquinones are to be understood as including all compounds based on the 1,4-benzene-diol system of the hydroquinone, for example hydroquinone or ubiquinones), and sodium iodide, Fe$_2$SO$_4$ being preferred as reducing agent. As a result of using the reducing agents, the reaction time can be lowered from hours to minutes and in some cases the yields can be radically increased (see F. W. Wassmundt et al., J. Org. Chem. 1995, 60, 1713–1719 and 4991–4994).

Normally the pigment to be treated, for example in the form of a press cake, is introduced in a solvent. The diazonium salt is advantageously prepared separately by reacting a metal nitrite or an organic nitrite with the aromatic amine compound X$^1$—Ar$^1$—NH$_2$ and/or X$^2$—Ar$^2$—NH$_2$ and is subsequently added to the pigment to be treated. Alternatively, the diazonium salt can also be prepared in situ, either by introducing the aromatic amine compound or the metal nitrite or the organic nitrite together with the pigment and adding the second component, or by introducing the pigment and adding the metal nitrite or the organic nitrite and the aromatic amine compound separately. The reducing agent, when it is used, is advantageously introduced together with the pigment.

Preferred solvents are water, water-containing solvents and protic solvents, such as alcohols, alcohol-containing solvents and mixtures thereof. Water is especially preferred. Metal nitrites and organic nitrites that can be used in the process according to the invention include, for example, ammonium nitrite, butyl nitrite, dicyclohexylammonium nitrite, ethyl nitrite, isoamyl nitrite, lithium nitrite, sodium nitrite, potassium nitrite and zinc nitrite. The reaction temperature and the reaction time are generally from 0° C. to 90° C. and from 15 minutes to 12 hours, both the reaction temperature and the reaction time depending to a great extent upon the reaction conditions selected. Depending on the nitrite selected, an acid or neutral pH is established.

In general, the pigment is dispersed in water, optionally with the addition of customary auxiliaries, such as dispersion auxiliaries, for example polar polymers, such as polyvinyl alcohol or copolymers of vinylpyrrolidone and vinyl acetate. The diazonium salt is prepared separately by reacting the primary amine with sodium nitrite and conc. hydrochloric acid in water at from 0 to 5° C. The diazonium salt prepared separately is added at low temperature (0 to 4° C.). Depending on the diazonium salt, the temperature is slowly increased to from 20 to 70° C. and the pH is increased up to 5 by the addition of a base, such as sodium hydroxide, sodium phosphate, sodium carbonate, ammonia etc. The reducing agent, when it is used, can be added before or after the addition of the diazonium salt. Depending on the surface-treated pigment, the pigment is isolated by filtration at the pH prevailing at the end of the reaction or at a higher pH, and washed and dried in customary manner. The excess reducing agent or the oxidised reducing agent is separated off by customary processes.

Surface-treated pigments of formula I can be used, for example, in the mass-colouring of high molecular weight organic materials. They are suitable especially for pigmenting plastics, surface coatings and printing inks.

The high molecular weight organic material to be coloured according to the invention may be of natural or synthetic origin and usually has a molecular weight in the range of from $10^3$ to $10^8$ g/mol. It can be, for example, a natural resin or a drying oil, rubber or casein or a modified natural substance, such as chlorinated rubber, an oil-modified alkyd resin, viscose, a cellulose ether or ester, such as cellulose acetate, cellulose propionate, cellulose acetobutyrate or nitrocellulose, but is especially a completely synthetic organic polymer (a thermosetting plastic or a thermoplastic), as are obtained by polymerisation, polycondensation or polyaddition, for example polyolefins, such as polyethylene, polypropylene or polyisobutylene, substituted polyolefins, such as polymerisation products of vinyl chloride, vinyl acetate, styrene, acrylonitrile, acrylic acid ester and/or methacrylic acid ester or butadiene, and also copolymerisation products of the said monomers, especially ABS or EVA.

From the range of polyaddition resins and polycondensation resins there may be mentioned condensation products of formaldehyde with phenols, so-called phenoplasts, and condensation products of formaldehyde with urea, thiourea and melamine, so-called aminoplasts, polyesters used as surface-coating resins, either saturated, such as alkyd resins, or unsaturated, such as maleic resins, and also linear polyesters and polyamides or silicones.

The mentioned high molecular weight compounds may be present individually or in mixtures as plastic masses or melts that can, if desired, be spun into fibres.

They can also be in the form of their monomers or in the polymerised state in dissolved form as film formers or binders for surface coatings or for printing inks, such as boiled linseed oil, nitrocellulose, alkyd resins, melamine resins, urea-formaldehyde resins or acrylic resins. The pigmenting of the high molecular weight organic substances using the surface-treated pigments of formula I according to the invention is effected, for example, by admixing a surface-treated pigment of formula I, optionally in the form of a masterbatch, with such substrates using roll mills or mixing or grinding apparatuses. The pigmented material is then generally brought into its desired final form by processes known per se, such as calendering, compression moulding, extrusion, spread-coating, casting or injection-moulding. In order to obtain different colour shades, it is also possible to add to the high molecular weight organic substances fillers or other colour-imparting constituents, such as white, coloured or black pigments or special-effect pigments, in each case in the desired amount.

For the pigmenting of surface coatings, the high molecular weight organic materials and the surface-treated pigments according to the invention are finely dispersed or dissolved, optionally together with additives, such as fillers, other pigments, siccatives or plasticisers, generally in an organic and/or aqueous solvent or solvent mixture. It is also possible to use a procedure in which the individual components are dispersed or dissolved separately or in which a plurality thereof are dispersed or dissolved together, and only then are all of the components combined.

A further embodiment accordingly relates also to mass-coloured high molecular weight organic material containing
(a) from 0.05 to 70% by weight, based on the sum of (a) and (b), of the surface-treated pigment of formula I according to the invention, and
(b) from 99.95 to 30% by weight, based on the sum of (a) and (b), of a high molecular weight organic material.

The material can be a ready-to-use composition or an article formed therefrom, or a masterbatch, for example in the form of granules. Where appropriate, the high molecular weight organic material coloured according to the invention can also comprise customary additives, for example stabilisers or further inorganic, metallic or organic pigments, such as rutile, carbon black, aluminium flakes, mica, which may or may not be coated, or any desired coloured pigments.

The mass-colouring of the high molecular weight organic material using the surface-treated pigment of formula I is carried out, for example, by mixing and processing the high molecular weight organic material with the surface-treated pigment of formula I according to the invention, optionally in the form of a masterbatch, in a manner known per se.

The surface-treated pigments of formula I are preferably used in surface coatings, especially in solvent-based automotive finishes, where they make a higher pigment content possible. Surface-treated pigments of formula Ia, preferably those in which m is an integer from 4 to 20, especially from 12 to 18, can be used especially in the pigmenting of partially crystalline plastics, especially those processed by injection-moulding, without the occurrence of warping. In the plastics processing industry "warping" is a known major problem observed in partially crystalline plastics following injection-moulding, more especially in the presence of organic pigments.

"Partially crystalline plastics" are to be understood as meaning those plastics that on solidification form small crystalline nuclei or aggregates (for example spherulites or quadrites), including plastics that exhibit such behaviour only in the presence of nucleating agents (for example organic pigments).

Partially crystalline plastics are generally thermoplastic high molecular weight organic materials having a molecular weight ($M_W$) of from $10^4$ to $10^8$, especially from $10^5$ to $10^7$, and a degree of crystallinity ($X_C$) of from 10 to 99.9%, preferably from 40 to 99%, especially from 80% to 99%. Preferred partially crystalline plastics are homopolymers, block or random copolymers and terpolymers of ethylene, propylene, butylene, styrene and/or divinylbenzene, especially α-olefins, such as HDPE, LDPE, polypropylene and polystyrene, and also polyesters, such as PET, polyamides, such as nylon 6 and nylon 66, and thermoplastic ionomers.

Especially preferred partially crystalline plastics are polyolefins, especially polyethylene of high density and polypropylene.

The partially crystalline plastics may optionally also comprise customary amounts of additives, for example, stabilisers, optical brighteners, fillers and/or lubricants.

The invention accordingly relates also to a composition comprising a partially crystalline plastics and a surface-treated pigment of formula I.

The preparation is carried out according to customary processes, for example by mixing the surface-treated pigments of formula I with the plastics granules or powder, and extruding the mixture to form fibres, films or granules. The latter can then be formed into articles, for example by injection-moulding, such articles exhibiting scarcely any warping on solidification or in many cases no warping at all.

Where appropriate, of course, additives may also be used in customary manner as further additional ingredients.

The surface-treated pigments according to the invention exhibit improved rheology properties and improved dispersion stability and can enable partially crystalline plastics to be mass-pigmented without warping. The surface treatment of the pigment results especially in a reduction in the viscosity of the pigment dispersion, which enables the dispersion to be loaded with a greater amount of pigment. The coloristic properties of the pigments are not adversely affected by the surface modification. The surface-treated pigments are distinguished especially by very good gloss values and fastness to light and to migration.

The following Examples illustrate the invention without limiting the scope thereof.

EXAMPLE 1

Reaction of C.I. Pigment Red 255 with the Diazonium Salt of Procaine ($H_2N$-Ph-C(O)—O—($CH_2)_2$—N($C_2H_5)_2$)

21.8 g of a 43.8% aqueous press cake of C.I. Pigment Red 255 are dispersed in 125 ml of water, together with 2.8 g of iron(II) sulfate ($FeSO_4 \cdot 7H_2O$) for 16 hours. 2.73 g of procaine.HCl (FLUKA) in 7.5 g of water and 3.5 ml of conc. hydrochloric acid are treated separately with 2.6 ml of 4M $NaNO_2$ solution at from 0 to 4° C. The diazonium salt is slowly added to the pigment suspension. The suspension is stirred at room temperature for 1.5 hours. The pH of the suspension is increased to 9.5–10 with 2N NaOH solution. The suspension is filtered and the residue is washed neutral with water. The filtration residue is dried at 80° C. and then pulverised.

EXAMPLE 2

Reaction of C.I. Pigment Red 255 with the Diazonium Salt of Procainamide ($H_2$-Ph-C(O)—NH—($CH_2)_2$—N($C_2H_5)_2$)

Example 1 is repeated, except that 2.72 g of procainamide.HCl are used instead of 2.73 g of procaine.HCl.

EXAMPLE 3

Reaction of C.I. Pigment Red 264 with the Diazonium Salt of Procainamide ($H_2N$-Ph-C(O)—NH—($CH_2)_2$—N($C_2H_5)_2$)

Example 2 is repeated, except that instead of C.I. Pigment Red 255 the corresponding amount of C.I. Pigment Red 264 is used.

EXAMPLE 4

Reaction of C.I. Pigment Blue 15:3 with the Diazonium Salt of 4-hexadecyl-sulfonylaniline 5 g of C.I. Pigment Blue 15:3 are dispersed in 50 ml of water and 1 ml of isopropanol. 0.5 g of 4-hexadecylsulfonylaniline in 8 g of water and 0.9 ml of conc. hydrochloric acid are treated separately with 0.4 ml of 4M $NaNO_2$ solution at from 0 to 4° C. The diazonium salt is slowly added to the pigment suspension. The suspension is stirred at room temperature for 2 hours, slowly heated to 65° C., stirred for one hour at 50° C. and filtered, and the residue is washed neutral with water. The filtration residue is dried at 80° C. and then pulverised.

EXAMPLE 5

2.0 g of each of the products obtained according to Examples 1 to 3 are dispersed for three hours according to a customary method in the following polyester surface-coating system:

5.5 g of ®Dynapol H700 (Dynamit Nobel)

0.6 g of ®Solsperse 24000 (Avecia)

4.8 g of xylene 7.1 g of butyl acetate

The dispersions are made up into a lake with 2.2 g of ®Maprenal MF 650 (Hoechst) and 4.5 g of a 20% solution of cellulose acetobutyrate in butanol/xylene 2:1 (®CAB 531.1, Eastman Chem.). The application of the resulting colour lake is effected by discharging it onto a glass plate. Prior to baking in a circulating-air drying cabinet (30' at 120° C.), the plate is exposed to air for 20 minutes at an inclination of 90°. The gloss values, measured using a gloss meter (™ZGM 1020, Zehntner) at an inclination of 20° in accordance with DIN 67530, are higher than those of untreated pigments.

EXAMPLE 6

1.4 g of the pigment obtained in Example 4 and 700 g of Stamilan® 9089U (HDPE/DSM) are mixed dry in a tumbler mixer for 10 minutes. The mixture is extruded in a single-screw extruder at 200° C. The resulting granules are processed in an injection-moulding machine at 240° C. to form plates of the dimensions 174×49×2.5 mm. After injection-moulding, the plates are conditioned at a temperature of 90° C. in a water bath for 30 minutes and stored at room temperature (~23° C.) for at least 15 hours. The plates are then measured precisely.

The results are comparable to those obtained using colourless Stamilan® 9089U. In contrast to plates with untreated pigments alone, the plates obtained are virtually completely warp-free.

EXAMPLE 7

To determine the flow behaviour, the viscosity of dispersions comprising the products of Examples 1, 2 or 3 is determined using a ®Rotovisco RV20 viscometer (HAAKE, measuring temperature 25° C., measuring system SV-SP, shearing range 0–500 $s^{-1}$). Compared with untreated pigments, the lake dispersions obtained with the products according to Examples 1 to 3 exhibit markedly better flow behaviour.

EXAMPLE 8

Reaction of C.I. Pigment Red 264 with the Diazonium Salt of naphthylamine-5-sulfonic Acid 72.8 g of a 41.2% aqueous press cake of C.I. Pigment Red 264 are dispersed in 550 ml of water for 16 hours. 1.67 g of naphthylamine-5-sulfonic acid in 8 g of water and 2.7 ml of conc. hydrochloric acid are treated separately with 2.1 ml of 4M $NaNO_2$ solution at from 0 to 4° C. The diazonium salt is slowly added to the pigment suspension. The suspension is stirred at room temperature for 2 hours, heated slowly to 50° C., stirred for one hour at 50° C. and filtered, and the residue is washed neutral with water. The filtration residue is dried at 80° C. and then pulverised.

EXAMPLE 9

Example 8 is repeated, the diazonium salt being prepared in situ.

EXAMPLE 10

Reaction of C.I. Pigment Red 255 with the Diazonium Salt of naphthylamine-5-sulfonic Acid Example 8 is repeated, except that instead of C.I. Pigment Red 264 the corresponding amount of C.I. Pigment Red 255 is used.

EXAMPLE 11

Reaction of C.I. Pigment Violet 19 with the Diazonium Salt of naphthylamine-5-sulfonic Acid Example 8 is repeated, except that instead of C.I. Pigment Red 264 the corresponding amount of the quinacridone pigment C.I. Pigment Violet 19 is used.

EXAMPLE 12

Reaction of C.I. Pigment Red 255 with the Diazonium Salt of Sulfanilic Acid 21.8 g of a 46% aqueous press cake of C.I. Pigment Red 255 are dispersed in 100 ml of water together with 1.2 g of iron(II) sulfate ($FeSO_4.7H_2O$) for 4 hours. 0.7 g of sulfanilic acid in 2.9 g of water and 1.38 g of conc. hydrochloric acid are treated separately with 1.08 ml of 4M $NaNO_2$ solution at 4° C. The diazonium salt is slowly added to the pigment suspension. The suspension is then stirred at room temperature for a further 2 hours and filtered, and the residue is washed neutral with water. The filtration residue is dried at 80° C. and then pulverised.

EXAMPLE 13

Example 12 is repeated, the diazonium salt being prepared in situ.

EXAMPLE 14

Reaction of C.I. Pigment Red 264 with the Diazonium Salt of Sulfanilic Acid 45.6 g of a 43.8% aqueous press cake of C.I. Pigment Red 264 are dispersed in 200 ml of water together with 5.6 g of iron(II) sulfate ($FeSO_4.7H_2O$) for 16 hours. 3.5 g of sulfanilic acid in 15 g of water and 7 ml of conc. hydrochloric acid are treated separately with 5.5 ml of 4M $NaNO_2$ solution at from 0 to 4° C. The diazonium salt is slowly added to the pigment suspension. The suspension is stirred at room temperature for 2 hours and filtered, and the residue is washed neutral with water. The filtration residue is dried at 80° C. and then pulverised.

EXAMPLE 15

Reaction of C.I. Pigment Red 255 with the Diazonium Salt of 4-amino-phenylphosphonate 21.8 g of a 46% aqueous press cake of C.I. Pigment Red 255 are dispersed in 100 ml of water together with 1.2 g of iron(II) sulfate ($FeSO_4.7H_2O$) for 4 hours.

0.7 g of 4-aminophenylphosphonic acid (FLUKA) in 2.9 g of water and 1.38 g of conc. hydrochloric acid are treated separately with 1.08 ml of 4M $NaNO_2$ solution at 4° C. The diazonium salt is slowly added to the pigment suspension. The suspension is stirred at room temperature for 1 hour and filtered, and the residue is washed neutral with water. The filtration residue is dried at 80° C. and then pulverised.

EXAMPLE 16

2.0 g of each of the products obtained according to Examples 8 to 15 are dispersed for three hours according to a customary method in the following polyester surface-coating system:

5.5 g of ®Dynapol H700 (Dynamit Nobel)

0.6 g of ®Solsperse 24000 (Avecia)

4.8 g of xylene 7.1 g of butyl acetate

The dispersions are made up into a lake with 2.2 g of ®Maprenal MF 650 (Hoechst) and 4.5 g of a 20% solution of cellulose acetobutyrate in butanol/xylene 2:1 (®CAB 531.1, Eastman Chem.). The application of the resulting colour lake is effected by discharging it onto a glass plate. Prior to baking in a circulating-air drying cabinet (30' at 120° C.), the plate is exposed to air for 20 minutes at an inclination of 90°. The gloss values, measured using a gloss meter (™ZGM 1020, Zehntner) at an inclination of 20° in accordance with DIN 67530, are higher than those of untreated pigments.

EXAMPLE 17

To determine flow behaviour, the viscosity of dispersions comprising the products of Examples 8 to 15 is determined using a ®Rotovisco RV20 viscometer (HAAKE, measuring temperature 25° C., measuring system SV-SP, shearing range 0–500 $s^{-1}$). Compared with untreated pigments, the lake dispersions obtained with the products according to Examples 1 to 3 exhibit markedly improved flow behaviour.

What is claimed is:

1. A surface-treated pigment of formula

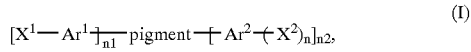

(I)

wherein $Ar^1$ and $Ar^2$ are each independently of the other a phenyl or naphthalene group.

n is an integer 1 or 2, n1 and n2 denote a value from 0 to 0.15, the sum of n1 and n2 being a value from 0.01 to 0.15, $X^1$ is a branched or unbranched alkyl radical or alkenyl radical having from 1 to 25 carbon atoms, the said alkyl radical is interrupted by one or more S or O atoms, or is a group —Y—$(CH_2)_m$—$R^1$, wherein Y is a group —$CH_2$—, —O—, —S—, —C(O)O—, —C(O)—, —C(O)—NH—, —$SO_2$NH— or —$SO_2$— and $R^1$ is a hydrogen atom or a group —$NR^2R^3$, wherein $R^2$ and $R^3$ are each independently of the other a hydrogen atom or a $C_{1-6}$alkyl radical, and m is an integer from 1 to 24, $X^2$ is a group —COOH, —$SO_3$H or —$P(O)OX^3OX^4$, wherein $X^3$ and $X^4$ are each independently of the other a hydrogen atom or a $C_{1-6}$alkyl radical, and pigment denotes an organic pigment, a mixture of organic pigments, a solid solution of organic pigments or a crystalline solid solution of organic pigments.

2. A surface-treated pigment according to claim 1, wherein the surface-treated pigment has the following formula

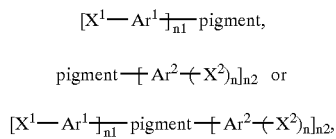

(Ia) $[X^1 - Ar^1]_{n1}$ pigment, (Ib) pigment $-[Ar^2-(X^2)_n]_{n2}$ or (Ic) $[X^1 - Ar^1]_{n1}$ pigment $-[Ar^2-(X^2)_n]_{n2}$, and n1 and n2 denote a value from 0.01 to 0.15.

3. A surface-treated pigment according to claim 1, wherein the organic pigment is a pigment of the 1-aminoanthraquinone, anthraquinone, anthrapyrimidine, azo, azomethine, quinacridone, quinacridonequinone, quinophthalone, diketopyrrolo-pyrrole, dioxazine, flavanthrone, indanthrone, indigo, isoindoline, isoindolinone, iso-violanthrone, perinone, perylene, phthalocyanine, pyranthrone or thioindigo series, a mixture of such pigments, a solid solution of such pigments or a crystalline solid solution of such pigments.

4. A surface-treated pigment according to claim 3, wherein the pigment is selected from (i) quinacridones of formula

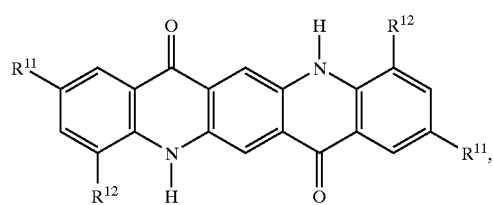

(XI)

wherein $R^{11}$ and $R^{12}$ are each independently of the other hydrogen, halogen, $C_{1-24}$alkyl, $C_{1-6}$alkoxy, or phenyl, (ii) pyrrolo[3,4-c]pyrroles of formula

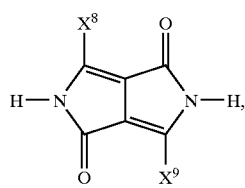

(XII)

wherein the radicals $X^8$ and $X^9$ are a group of formula

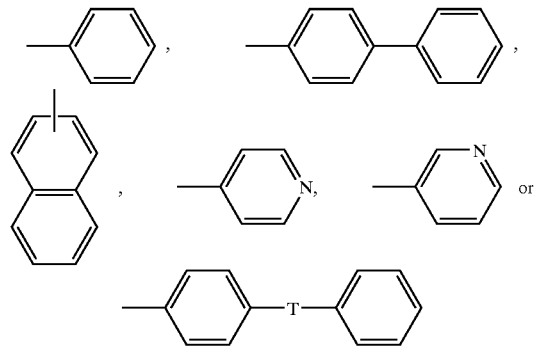

or wherein the radical $X^8$ is a group of formula

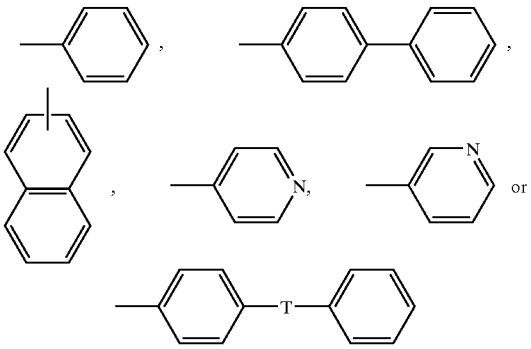

and the radical $X^9$ is a group of the formula

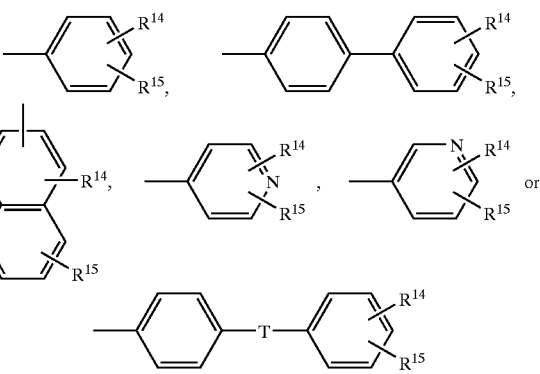

wherein $R^{14}$ and $R^{15}$ are each independently of the other a hydrogen atom, a halogen atom, a $C_{1-24}$alkyl radical, a $C_{1-6}$alkoxy radical, a $C_{1-18}$alkylthio radical, a $C_{1-18}$alkylamino radical, a phenyl group, a trifluoromethyl group or a group CN or $NO_2$, with the proviso that at least one of the radicals $R^{14}$ and $R^{15}$ is not a hydrogen atom, T is $-CH_2-$, $-CH(CH_3)-$, $-C(CH_3)_2-$, $-CH=N-$, $-N=N-$, $-O-$, $-S-$, $-SO-$, $-SO_2-$ or $-NR^{16}-$, wherein $R^{16}$ is hydrogen or $C_{1-6}$alkyl, and (iii) copper phthalocyanines of formula

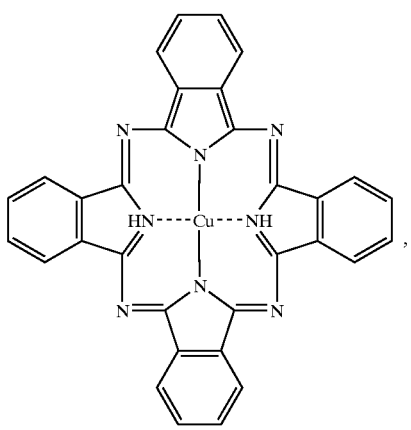

(XIII)

and copper phthalocyanines of formula (XIII) which are substituted by from 1 to 5 chlorine atoms, (iv) 1-aminoanthraquinone and anthraquinone pigments of formula

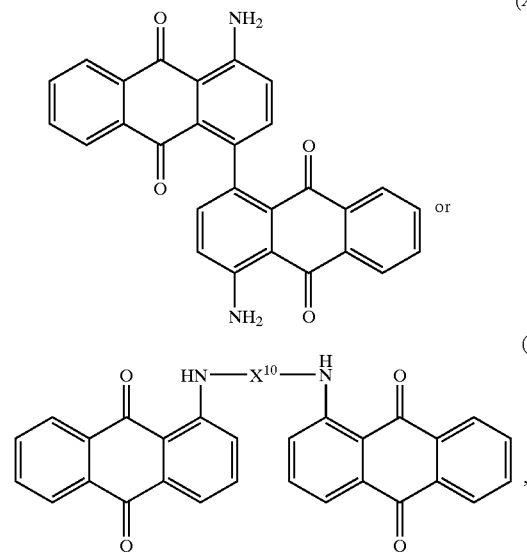

(XIV)

(XV)

wherein $X^{10}$ is a group

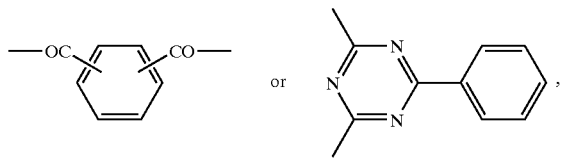

(v) dioxazines of formula

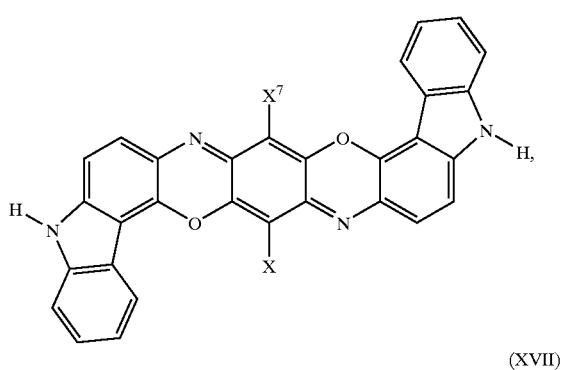

(XVI)

(XVII)

or

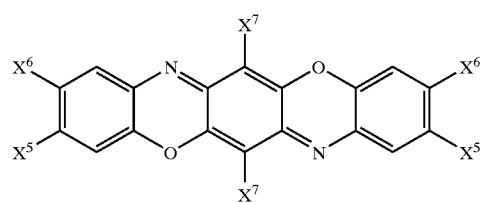

(vi) indanthrones of formula

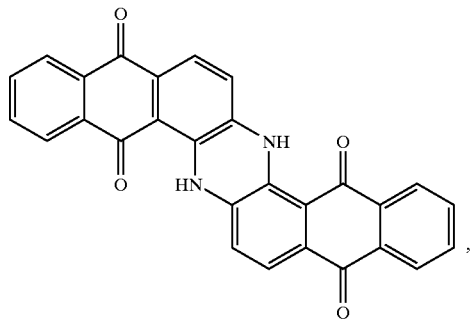

(XVIII)

and indanthrones of formula (XVIII) which are substituted by 1 or 2 chlorine atoms,
wherein $X^5$ is a $C_{1-4}$alkoxy radical, $X^6$ is a benzoylamino group and $X^7$ is a chlorine atom or a radical $NHC(O)CH_3$; a mixture of such pigments, a solid solution of such pigments or a crystalline solid solution of such pigments.

5. A surface-treated pigment according to claim 4, wherein the pigment is derived from Pigment Blue 15:p, wherein p is an integer from 1 to 6, C.I. Pigment Red 255, C.I. Pigment Red 264, C.I. Pigment Violet 19, C.I. Pigment Red 177, C.I. Pigment Blue 60 or a solid solution of C.I. Pigment Red 264 or C.I. Pigment Red 255.

6. A surface-treated pigment according to claim 1, wherein
Y is a group $-CH_2-$, $-O-$, $-S-$, $-C(O)O-$, $-C(O)-$, $-C(O)-NH-$, $-SO_2NH-$ or $-SO_2-$,
$R^1$ is a hydrogen atom or a group $-NR^2R^3$, wherein $R^2$ and $R^3$ are each independently of the other a $C_{1-6}$alkyl radical, and
m is an integer from 12 to 18.

7. A process for the preparation of a surface-treated pigment according to claim 1, comprising the reaction of a diazonium salt of formula

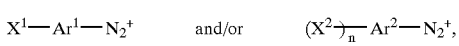

with an organic pigment, a mixture of organic pigments, a solid solution of organic pigments or a crystalline solid solution of organic pigments, optionally in the presence of a reducing agent.

8. A coloured organic material having a molecular weight in the range of from $10^3$ to $10^8$ g/mol, containing
(a) from 0.05 to 70% by weight, based on the sum of (a) and (b), of the surface-treated pigment according to claim 1, and (b) from 99.95 to 30% by weight, based on the sum of (a) and (b), of a high molecular weight organic material.

9. A method of coloring an organic material having a molecular weight in the range of from $10^3$ to $10^8$ g/mol by mixing a surface-treated pigment of formula

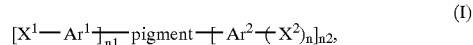

(I)

wherein $Ar^1$ and $Ar^2$ are each independently of the other a phenyl or naphthalene group,
n is an integer 1 or 2,
n1 and n2 denote a value from 0 to 0.15, the sum of n1 and n2 being a value from 0.01 to 0.15, $X^1$ is a branched or unbranched alkyl radical or alkenyl radical having from 1 to 25 carbon atoms, the alkyl radical is interrupted by one or more S or O atoms, a group —Y—$(CH_2)_m$—$R^1$, wherein Y is a group —$CH_2$—, —O—, —S—, —C(O)O—, —C(O)—, —C(O)—NH—, —$SO_2$NH— or —$SO_2$— and $R^1$ is a hydrogen atom or a group —$NR^2R^3$, wherein $R^2$ and $R^3$ are each independently of the other a hydrogen atom or a $C_{1-6}$alkyl radical, and m is an integer from 1 to 24, $X^2$ is a group —COOH, —$SO_3$H or —P(O)$OX^3OX^4$, wherein $X^3$ and $X^4$ are each independently of the other a hydrogen atom or a $C_{1-6}$alkyl radical, and pigment denotes an organic pigment, a mixture of organic pigments, a solid solution of organic pigments or a crystalline solid solution of organic pigments, into said high molecular weight material.

10. A method of mass-coloring of partially crystalline plastics by mixing a surface-treated pigment of formula (I)

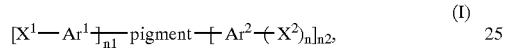
(I)

wherein $Ar^1$ and $Ar^2$ are each independently of the other a phenyl or naphthalene group, n is an integer 1 or 2, n1 and n2 denote a value from 0 to 0.15, the sum of n1 and n2 being a value from 0.01 to 0.15, $X^1$ is a branched or unbranched alkyl radical or alkenyl radical having from 1 to 25 carbon atoms, the alkyl radical is interrupted by one or more S or O atoms, a group —Y—$(CH_2)_m$—$R^1$, wherein Y is a group —$CH_2$—, —O—, —S—, —C(O)O—, —C(O)—, —C(O)—NH—, —$SO_2$NH— or —$SO_2$—, $R^1$ is a hydrogen atom or a group —$NR^2R^3$, wherein $R^2$ and $R^3$ are each independently of the other a $C_{1-6}$alkyl radical, and m is an integer from 12 to 18

$X^2$ is a group —COOH, —$SO_3$H or —P(O)$OX^3OX^4$, wherein $X^3$ and $X^4$ are each independently of the other a hydrogen atom or a $C_{1-6}$alkyl radical, and pigment denotes an organic pigment, a mixture of organic pigments, a solid solution of organic pigments or a crystalline solid solution of organic pigments, into said plastics.

* * * * *